United States Patent
Lee

(10) Patent No.: US 11,947,484 B2
(45) Date of Patent: Apr. 2, 2024

(54) UNIVERSAL SERIAL BUS (USB) HUB WITH HOST BRIDGE FUNCTION AND CONTROL METHOD THEREOF

(71) Applicant: GENESYS LOGIC, INC., New Taipei (TW)

(72) Inventor: Wei-te Lee, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 0 days.

(21) Appl. No.: 18/088,879

(22) Filed: Dec. 27, 2022

(65) Prior Publication Data

US 2024/0028548 A1 Jan. 25, 2024

(30) Foreign Application Priority Data

Jul. 25, 2022 (TW) .................................. 111127857

(51) Int. Cl.
*G06F 13/42* (2006.01)
*G06F 13/40* (2006.01)

(52) U.S. Cl.
CPC ...... *G06F 13/4282* (2013.01); *G06F 13/4027* (2013.01); *G06F 2213/0042* (2013.01)

(58) Field of Classification Search
CPC ............. G06F 13/4282; G06F 13/4027; G06F 2213/0042
See application file for complete search history.

(56) References Cited

U.S. PATENT DOCUMENTS

| 6,798,764 | B2 | | 9/2004 | Jiang | |
|---|---|---|---|---|---|
| 7,523,243 | B2 | * | 4/2009 | Bohm | G06F 13/385 |
| | | | | | 710/110 |
| 7,627,708 | B2 | * | 12/2009 | Bohm | G06F 13/385 |
| | | | | | 710/110 |
| 9,460,037 | B2 | * | 10/2016 | Voto | G06F 13/4045 |
| 10,162,788 | B2 | * | 12/2018 | Shetty | G06F 13/4022 |
| 10,331,604 | B2 | * | 6/2019 | Ghosh | G06F 13/4045 |
| 10,445,274 | B2 | * | 10/2019 | Lee | G06F 13/4022 |
| 2008/0120454 | A1 | | 5/2008 | Chang et al. | |
| 2017/0329733 | A1 | | 11/2017 | Lin et al. | |
| 2021/0019274 | A1 | * | 1/2021 | Yu | G06F 13/4027 |
| 2023/0259484 | A1 | * | 8/2023 | Chung | G06F 13/40 |
| | | | | | 710/313 |

FOREIGN PATENT DOCUMENTS

| CN | 214202366 U | 9/2021 |
|---|---|---|
| TW | 200823669 A | 6/2008 |
| TW | M635332 U | 12/2022 |

* cited by examiner

*Primary Examiner* — Henry Tsai
*Assistant Examiner* — Christopher A Daley
(74) *Attorney, Agent, or Firm* — Rivka Friedman

(57) ABSTRACT

A universal serial bus (USB) hub with a host bridge function and a control method thereof are provided. The USB hub utilizes a host bridge controller to connect two upstream ports so that two host devices connected to the two upstream ports are capable of transmitting/receiving data each other synchronously, thereby increasing usage convenience and flexibility and making full use of the tow upstream ports.

17 Claims, 2 Drawing Sheets

UNIVERSAL SERIAL BUS (USB) HUB WITH HOST BRIDGE FUNCTION AND CONTROL METHOD THEREOF

CROSS REFERENCE TO RELATED APPLICATIONS

This application claims priority to Taiwan Application Serial No. 111127857, filed Jul. 25, 2022, the disclosure of which is incorporated herein by reference.

FIELD OF DISCLOSURE

The present disclosure relates to a hub and its method, in particular to a USB hub with a host bridge function and a control method thereof.

BACKGROUND

With a rapid development of information technology, an application of electronic products is becoming more and more popular, such as notebooks, mobile phones, tablets, and other handheld electronic devices can be seen everywhere. A characteristic of these electronic devices is that they can be carried around and used anytime and anywhere. Moreover, in order to enable various electronic devices to be connected to each other for a large amount of data transmission, the multiple electronic devices are usually plugged into downstream ports of a hub by a universal serial bus (USB) connection line. An upstream port of the hub is connected to a host device, so that the electronic devices and the host device can transmit or receive data with each other through a USB transmission protocol of the hub.

In the prior art, a USB connection line is used to connect an upstream port of the hub to the host device. Another upstream port of the hub cannot be connected to another host device, so that the two host devices cannot transmit data through the two upstream ports. It is quite inconvenient to use, and the connection between the hub and the host devices is greatly restricted. Accordingly, it is necessary to provide a new type of hub to improve the above problems.

SUMMARY OF DISCLOSURE

One purpose of the present disclosure is to provide a USB hub with a host bridge function and a control method thereof. Two upstream ports are connected by a host bridge controller, so that two host devices connected to the two upstream ports can transmit data to each other synchronously, which improves the convenience of use and the flexibility of the hub.

In order to achieve the above purpose, the USB hub with the host bridge function of the present disclosure is suitable for connecting a first host device, a second host device, and a plurality of peripheral devices. The USB hub includes a first upstream port, a second upstream port, a USB controller, a switch module, a host bridge controller, and a plurality of first downstream ports. The first upstream port is configured to connect to the first host device. The second upstream port is configured to connect to the second host device. The USB controller is coupled to the first upstream port and the second upstream port, and is configured to determine power levels of the first upstream port and the second upstream port, so as to determine that the power levels of the first upstream port and the second upstream port are greater than a predetermined level. The switch module is connected to the USB controller, the first upstream port, and the second upstream port, and is configured to switch the first upstream port and the second upstream port to respectively connect the USB controller and the host bridge controller. The host bridge controller is connected to the USB controller and the switch module, is configured to receive a first data from the first upstream port via the USB controller and the switch module and transmit the first data to the second host device connected to the second upstream port, and is configured to receive a second data from the second upstream port via the USB controller and the switch module and transmit the second data to the first host device connected to the first upstream port. The plurality of first downstream ports are coupled to the USB controller, are connected to the peripheral devices, and are configured to transmit and receive the first data and the second data to/from the peripheral devices.

In some embodiments, the host bridge controller includes a first bridge, a buffer, and a second bridge. The first bridge is connected to the switch module and the USB controller, and is configured to transmit and receive the first data and the second data transmitted via the switch module and the USB controller, and the first data and the second data parsed by the USB controller. The buffer is connected to the first bridge, and is configured to store the first data and the second data. The second bridge is connected to the buffer and the USB controller, and is configured to transmit and receive the first data and the second data transmitted via the switch module and the USB controller, and the first data and the second data parsed by the USB controller.

In some embodiments, the switch module is disposed in the host bridge controller, and the host bridge controller controls switching of the switch module.

In some embodiments, the USB hub with the host bridge function further includes an upstream control circuit. The upstream control circuit is connected between the switch module and the USB controller, and is configured to control data transmission and reception between the first host device and the USB controller.

In some embodiments, the USB hub with the host bridge function further includes a plurality of first downstream control circuits. The plurality of first downstream control circuits are connected between the first downstream ports and the USB controller, and are configured to control data transmission and reception between the first downstream ports and the USB controller.

In some embodiments, the USB hub with the host bridge function further includes a second downstream control circuit. The second downstream control circuit is connected between the USB controller, the host bridge controller, and the switch module, and is configured to control the data transmission and reception between the USB controller and the host bridge controller.

In some embodiments, the power levels are level values of VBUS pins defined by USB interfaces of the first host device and the second host device.

In some embodiments, when the switch module switches the first host device so that the first upstream port is connected to the USB controller, the switch module simultaneously switches the second host device so that the second upstream port is connected to the host bridge controller, and the first data from the first upstream port is transmitted from the first host device to the second host device.

In some embodiments, when the switch module switches the second host device so that the second upstream port is connected to the USB controller, the switch module simultaneously switches the first host device so that the first upstream port is connected to the host bridge controller, and the second data from the second upstream port is transmitted from the second host device to the first host device.

The present disclosure also provides a control method of a universal serial bus (USB) hub with a host bridge function of suitable for connecting a first host device, a second host device, and a plurality of peripheral devices, the control method includes steps of:

determining power levels of a first upstream port and a second upstream port by a USB controller, to determine that the power levels of the first upstream port and the second upstream port are greater than a predetermined level;

switching the first upstream port and the second upstream port to respectively connect the USB controller and a host bridge controller by a switch module according to the predetermined level;

receiving, by the host bridge controller, a first data from the first upstream port via the USB controller and the switch module and transmitting the first data to the second host device connected to the second upstream port, and receiving a second data from the second upstream port via the USB controller and the switch module and transmitting the second data to the first host device connected to the first upstream port; and transmitting and receiving the first data and the second data to/from the peripheral devices by a plurality of first downstream ports.

In some embodiments, the step of receiving, by the host bridge controller, the first data from the first upstream port via the USB controller and the switch module and transmitting the first data to the second host device connected to the second upstream port, and receiving the second data from the second upstream port via the USB controller and the switch module and transmitting the second data to the first host device connected to the first upstream port includes steps of: transmitting and receiving, by a first bridge, the first data and the second data transmitted via the switch module and the USB controller, and the first data and the second data parsed by the USB controller; storing the first data and the second data by a buffer; and transmitting and receiving, by a second bridge, the first data and the second data transmitted via the switch module and the USB controller, and the first data and the second data parsed by the USB controller.

In some embodiments, the step of receiving, by the host bridge controller, the first data from the first upstream port via the USB controller and the switch module and transmitting the first data to the second host device connected to the second upstream port, and receiving the second data from the second upstream port via the USB controller and the switch module and transmitting the second data to the first host device connected to the first upstream port includes a step of: controlling, by an upstream control circuit, data transmission and reception between the first host device and the USB controller.

In some embodiments, the step of transmitting and receiving the first data and the second data to/from the peripheral devices by the plurality of first downstream ports includes a step of: controlling, by a plurality of first downstream control circuits, data transmission and reception between the first downstream ports and the USB controller.

In some embodiments, the step of switching the first upstream port and the second upstream port to respectively connect the USB controller and the host bridge controller by the switch module according to the predetermined level includes a step of: controlling, by a second downstream control circuit, data transmission and reception between the USB controller and the host bridge controller.

In some embodiments, the power levels are level values of VBUS pins defined by USB interfaces of the first host device and the second host device.

In some embodiments, in response to the first host device being connected to the USB hub earlier than the second host device, the switch module performs a switching operation so that the first host device is connected to the USB controller via the first upstream port, the switch module is switched simultaneously, and the second host device is connected to the host bridge controller via the second upstream port so that the first data from the first upstream port is transmitted from the first host device to the second host device.

In some embodiments, in response to the second host device being connected to the USB hub earlier than the first host device, the switch module switches the second host device so that the second upstream port is connected to the USB controller, the switch module switches the first host device simultaneously, and the first upstream port is connected to the host bridge controller so that the second data from the second upstream port is transmitted from the second host device to the first host device.

In the USB hub with the host bridge function and its control method of the present disclosure, the two upstream ports are connected by the host bridge controller, so that the two host devices connected to the two upstream ports can transmit data to each other in a bidirectional synchronous manner, thereby improving the convenience and flexibility of the hub to make full use of the two upstream ports.

BRIEF DESCRIPTION OF DRAWINGS

In order to more clearly illustrate the technical solution in embodiments of the present disclosure, the following briefly introduces the accompanying drawings that need to be used in the description of the embodiments. Apparently, the drawings in the following description are only some examples of the present disclosure. For those skilled in the art of the present disclosure, other drawings can also be obtained from these drawings.

DETAILED DESCRIPTION

Figure 1:
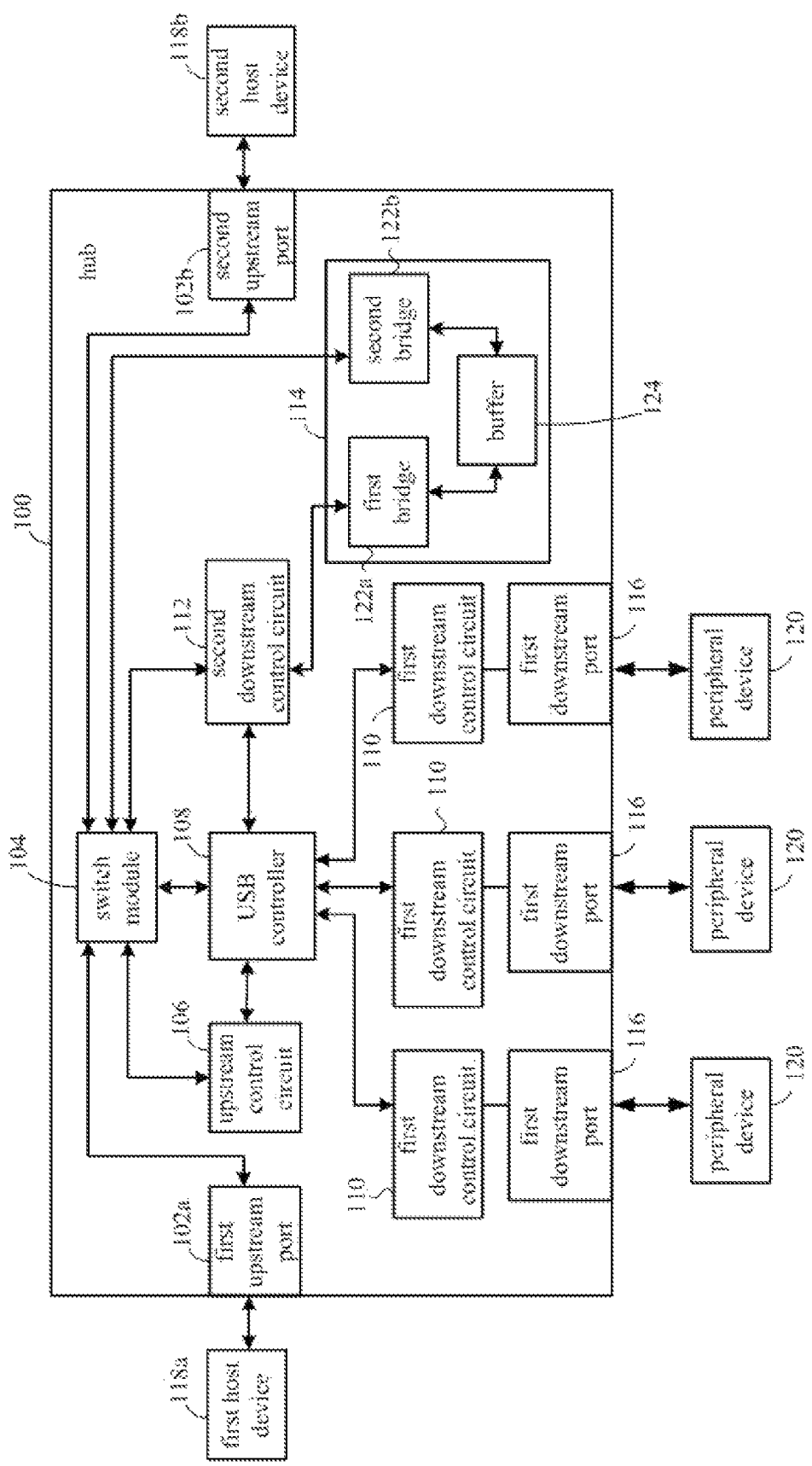
FIG. 1 is a block diagram of a universal serial bus hub with a host bridge function according to an embodiment of the present disclosure.

Referring to the accompanying drawings, same reference numerals represent the same components or similar components. The principles of the present disclosure are exemplified by implementation in an appropriate computing environment. The following description is based on the illustrated specific embodiments of the present disclosure, which should not be construed as limiting other specific embodiments not described in detail in the present disclosure.

Referring to FIG. 1, which shows a block diagram of a universal serial bus (USB) hub 100 with a host bridge function according to an embodiment of the present disclosure. The USB hub 100 is suitable for connecting a first host device 118a, a second host device 118b, and a plurality of peripheral devices 120. The hub 100 includes a first upstream port 102a, a second upstream port 102b, a switch module 104, an upstream control circuit 106, a USB controller 108, a plurality of first downstream control circuits 110, a second downstream control circuit 112, a host bridge controller 114, and a plurality of first downstream port 116. The first upstream port 102a is configured to connect to the first host device 118a, and the second upstream port 102b is configured to connect to the second host device 118b.

As shown in FIG. 1, the USB controller 108 is coupled to the first upstream port 102a and the second upstream port 102b to determine power levels of the first upstream port 102a and the second upstream port 102b, so as to determine that the power levels of the first upstream port 102a and the second upstream port 102b are greater than a predetermined level, and to determine whether the first host device 118a and the second host device 118b are respectively connected to the first upstream port 102a and the second upstream port 102b. In some embodiments, the power levels are level values of VBUS pins defined by USB interfaces of the first host device 118a and the second host device 118b. In some embodiments, the USB controller 108 is coupled to the first upstream port 102a through the upstream control circuit 106 and the switch module 104, and is coupled to the second upstream port 102b through the second downstream control circuit 112 and the host bridge controller 114.

As shown in FIG. 1, the switch module 104 is connected to the USB controller 108, the first upstream port 102a, and the second upstream port 102b for switching the first upstream port 102a and the second upstream port 102b to connect to the USB controller 108 and the host bridge controller 114 respectively. In some embodiments, the switch module 104 is connected to the second downstream control circuit 112, the host bridge controller 114, and the second upstream port 102b, or is coupled to the second upstream port 102b through the second downstream control circuit 112 and the host bridge controller 114. In some embodiments, the second downstream control circuit 112 is connected between the USB controller 108, the host bridge controller 114, and the switch module 104 to control data transmission and reception between the USB controller 108 and the host bridge controller 114. In some embodiments, as shown in FIG. 1, the switch module 104 is independently arranged outside the host bridge controller 114 to switch the first upstream port 102a and the second upstream port 102b to connect to the USB controller 108 and the host bridge controller 114 respectively.

In another embodiment, the switch module 104 is disposed in the host bridge controller 114, and the host bridge controller 114 controls switching of the switch module.

As shown in FIG. 1, the host bridge controller 114 is connected to the USB controller 108 and the switch module 104, is configured to receive a first data from the first upstream port 102a via the USB controller 108 and the switch module 104 and transmit the first data to the second host device 118b connected to the second upstream port 102b, and is configured to receive a second data from the second upstream port 102b via the USB controller 108 and the switch module 104 and transmit the second data to the first host device 118a connected to the first upstream port 102a. A plurality of first downstream ports 116 are coupled to the USB controller 108, are connected to the peripheral devices 120, and are configured to transmit and receive the first data and the second data to/from the peripheral devices 120. In some embodiments, a plurality of first downstream control circuits 110 are connected between the first downstream ports 116 and the USB controller 108 to control data transmission and reception between the first downstream ports 116 and the USB controller 108. In some embodiments, the host bridge controller 114 is connected to the USB controller 108 through a second downstream control circuit 112.

In FIG. 1, the host bridge controller 114 includes a first bridge 122a, a buffer 124, and a second bridge 122b. The first bridge 122a is connected to the switch module 104 and the USB controller 108 for transmitting and receiving the first data and the second data transmitted through the switch module 104 and the USB controller 108, and the first data and the second data parsed by the USB controller 108. In some embodiments, the first bridge 122a is connected to the switch module 104 through the second downstream control circuit 112. The buffer 124 is connected to the first bridge 122a for storing the first data and the second data. In some embodiments, the buffer 124 is connected between the first bridge 122a and the second bridge 122b. The second bridge 122b is connected to the buffer 124 and the USB controller 108 for transmitting and receiving the first data and the second data transmitted through the switch module 104 and the USB controller 108, and the first data and the second data parsed by the USB controller 108. In some embodiments, the second bridge 122b is connected to the USB controller 108 through the switch module 104.

In the embodiment shown in FIG. 1, the upstream control circuit 106 is connected between the first upstream port 102a and the USB controller 108 to control data transmission and reception between the first host device 118a and the USB controller 108. The plurality of first downstream control circuits 110 are connected between the first downstream ports 116 and the USB controller 108 to control data transmission and reception between the first downstream ports 116 and the USB controller 108.

In FIG. 1, when the first host device 118a is connected to the hub 100 earlier than the second host device 118b, the switch module 104 will perform a switching operation so that the first host device 118a is connected to the USB controller 108 via the first upstream port 102a. Simultaneously, the switch module 104 will switch, the second host device 118b is connected to the host bridge controller 114 via the second upstream port 102b, so that the first data from the first upstream port 102a is transmitted from the first host device 118a to the second host device 118b. In other words, when the first host device 118a is connected to the USB controller 108 via the first upstream port 102a, the second host device 118b is simultaneously connected to the host bridge controller 114 via the second upstream port 102b, so that the first host device 118a and the second host device 118b can synchronously access the data in the host bridge controller 114. For example, the first host device 118a transmits the first data to the host bridge controller 114, and the second host device 118b receives the first data transmitted by the first host device 118a. Alternatively, for example, the second host device 118b transmits the second data to the host bridge controller 114, and the first host device 118a receives the second data transmitted by the second host device 118b. At the same time, the first host device 118a can access data to the peripheral devices 120 through the USB controller 108 and through the downstream control circuit 110 and the first downstream port 116.

Similarly, when the second host device 118b is connected to the hub 100 earlier than the first host device 118a, the switch module 104 will switch the second host device 118b so that the second upstream port 102b is connected to the USB controller 108. Simultaneously, the switch module 104 will switch the first host device 118a, so that the first upstream port 102a is connected to the host bridge controller 114, and the second data from the second upstream port 102b is transmitted from the second host device 118b to the first host device 118a. In other words, when the second host device 118b is connected to the hub 100 earlier than the first host device 118a, the second host device 118b is connected to the USB controller 108 via the second upstream port 102b, and the first host device 118a is simultaneously connected to the host bridge controller 114 via the first upstream port 102a. Thus, the second host device 118b and the first host device 118a can synchronously access the data in the host bridge controller 114. For example, the second host device 118a transmits the second data to the host bridge controller 114, and the first host device 118a receives the first data transmitted by the second host device 118b. Alternatively, for example, the first host device 118a transmits the first data to the host bridge controller 114, and the second host device 118b receives the first data transmitted by the first host device 118a. At the same time, the second host device 118b can access data to the peripheral devices 120 through the USB controller 108 and through the downstream control circuit 110 and the first downstream port 116.

In a preferred embodiment, when the first host device 118a is connected to the hub 100 earlier than the second host device 118b, the switch module 104 will perform the switching operation, so that the first host device 118a is connected to the USB controller 108 via the first upstream port 102a. Furthermore, the first data of the first host device 118a can be transmitted to the host bridge controller 114 via the first upstream port 102a, the switch module 104, the upstream control circuit 106, the USB controller 108, and the second downstream control circuit 112 in sequence. Simultaneously, the switch module 104 will switch to make the second host device 118b to connect to the host bridge controller 114 via the second upstream port 102b. Therefore, the first data from the first upstream port 102a is transmitted from the first host device 118a to the second host device 118b.

Correspondingly, when the second host device 118b is connected to the hub 100 earlier than the first host device 118a, the switch module 104 will perform the switching operation to make the second host device 118b to connect to the USB controller 108 via the second upstream port 102b. Furthermore, the second data of the second host device 118b can be transmitted to the host bridge controller 114 via the second upstream port 102b, the switch module 104, the upstream control circuit 106, the USB controller 108, and the second downstream control circuit 112 in sequence. Simultaneously, the switch module 104 will switch, the first host device 118a is connected to the host bridge controller 114 via the first upstream port 102a, so that the second data from the second upstream port 102b is transmitted from the second host device 118b to the first host device 118a.

In this way, the first host device 118a and the second host device 118b can mutually access data in the host bridge controller 114 synchronously. For example, the first host device 118a transmits the first data to the host bridge controller 114, and the second host device 118b receives the first data transmitted by the first host device 118a. Alternatively, for example, the second host device 118b transmits the second data to the host bridge controller 114, and the first host device 118a receives the second data transmitted by the second host device 118b.

According to the above, in the hub 100 and the control method of the USB with the host bridge function of the present disclosure, the two upstream ports 102a/102b are connected by the host bridge controller 114, so that the two host devices 118a/118b connected to the two upstream ports 102a/102b can transmit data to each other synchronously, thereby improving the convenience and flexibility of use of the hub 100, so as to make full use of the two upstream ports 102a/102b.

Figure 2:
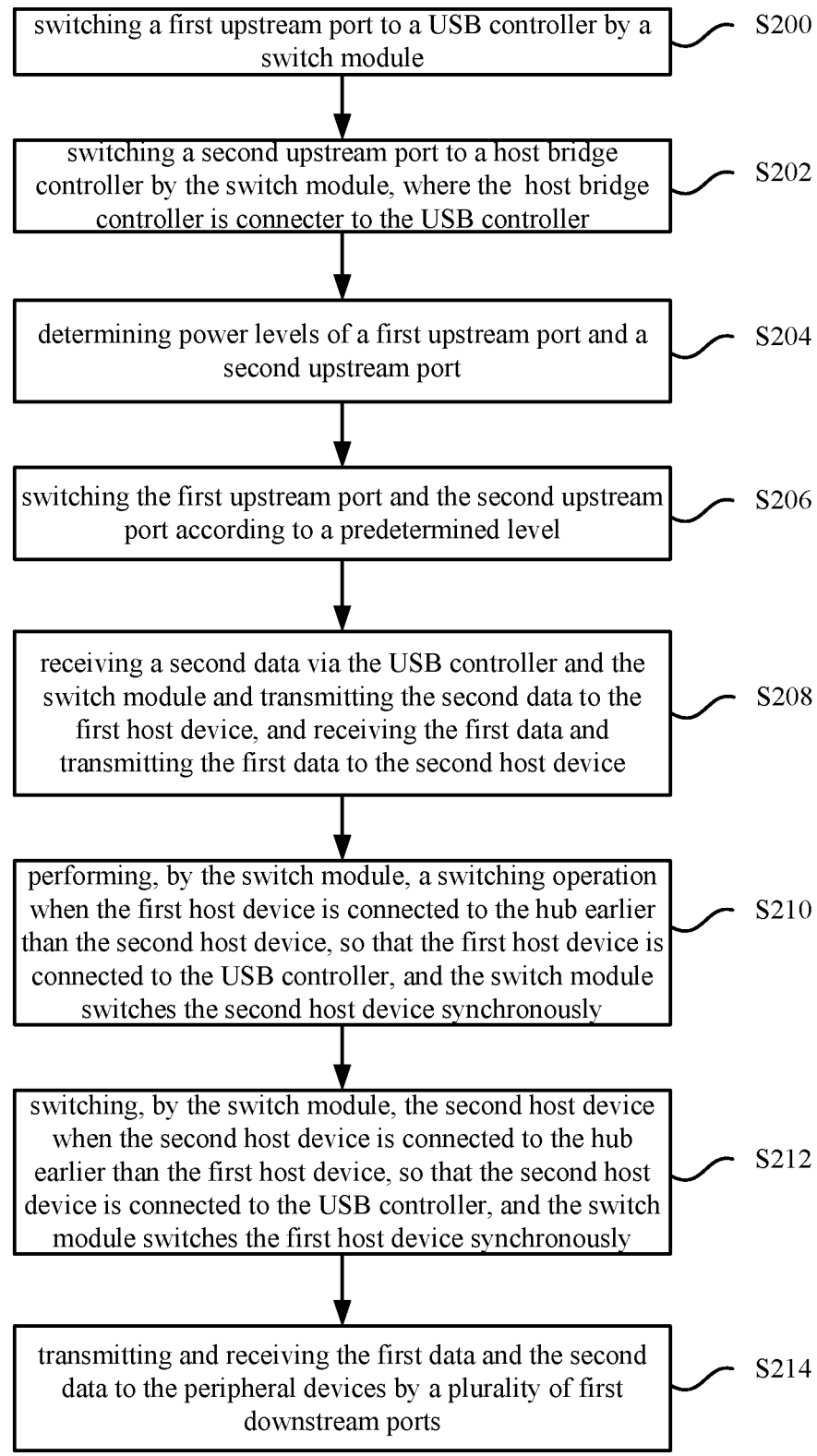
FIG. 2 is a flowchart of a control method of a universal serial bus hub with a host bridge function according to an embodiment of the present disclosure.

Referring to FIG. 1 and FIG. 2, FIG. 2 is a flowchart of a control method of a universal serial bus hub 100 with a host bridge function according to an embodiment of the present disclosure.

In step S200, when the first host device 118a is connected to the first upstream port 102a, the switch module 104 switches the first upstream port 102a to the USB controller 108. In one embodiment, the upstream control circuit 106 is configured to control data transmission and reception between the first host device 118a and the USB controller 108.

In step S202, when the second host device 118b is connected to the second upstream port 102b, the switch module 104 switches the second upstream port 102b to the host bridge controller 114, and the host bridge controller 114 is connected to the USB controller 108.

In step S204, the USB controller 108 determines power levels of the first upstream port 102a and the second upstream port 102b to determine that the power levels of the first upstream port 102a and the second upstream port 102b are greater than a predetermined level. In one embodiment, the power levels are level values of VBUS pins defined by USB interfaces of the first host device 118a and the second host device 118b.

In step S206, according to the predetermined level, the switch module 104 is configured to switch the first upstream port 102a and the second upstream port 102b to connect to the USB controller 108 and the host bridge controller 114 respectively. In one embodiment, the second downstream control circuit 112 is configured to control the data transmission and reception between the USB controller 108 and the host bridge controller 114.

In step S208, the host bridge controller 114 receives the first data from the first upstream port 102a via the USB controller 108 and the switch module 104, and transmits the first data to the second host device 118b connected to the second upstream port 102b. Moreover, the host bridge controller 114 receives the second data from the second upstream port 102b via the USB controller 108 and the switch module 104, and transmits the second data to the first host device 118a connected to the first upstream port 102a. The step S208 also includes the following steps. The first bridge 122a transmits and receives the first data and the second data transmitted via the switch module 104 and the USB controller 108, and the first data and the second data parsed by the USB controller 108. The buffer 124 stores the first data and the second data. The second bridge 122b transmits and receives the first data and the second data transmitted via the switch module 104 and the USB controller 108, and the first data and the second data parsed by the USB controller 108.

In step S210, when the first host device 118a is connected to the hub 100 earlier than the second host device 118b, the switch module 104 performs a switching operation so that the first host device 118a is connected to the USB controller 108 via the first upstream port 102a. The switch module 104 switches simultaneously to connect the second host device 118b to the host bridge controller 114 via the second upstream port 102b, so that the first data from the first upstream port 102a is transmitted from the first host device 118a to the second host device 118b.

In step S212, when the second host device 118b is connected to the hub 100 earlier than the first host device 118a, the switch module switches 104 the second host device 118a so that the second upstream port 102b is connected to the USB controller 108. The switch module 104 simultaneously switches the first host device 118a so that the first upstream port 102a is connected to the host bridge controller 114, and the second data from the second upstream port 102b is transmitted from the second host device 118b to the first host device 118a.

In step S214, the first data and the second data are transmitted to and received from the peripheral devices 120 by the plurality of first downstream ports 116. In one embodiment, the plurality of first downstream control circuits 110 are used to control data transmission and reception between the first downstream ports 116 and the USB controller 108.

In summary, in the USB hub with the host bridge function and its control method of the present disclosure, the two upstream ports are connected by the host bridge controller, so that the two host devices connected to the two upstream ports can transmit data to each other in a bidirectional synchronous manner, thereby improving the convenience and flexibility of the hub to make full use of the two upstream ports.

Although the present disclosure has been disclosed above with preferred embodiments, it is not intended to limit the present disclosure. Those skilled in the art of the present disclosure may make various changes and modifications without departing from the spirit and scope of the present disclosure. Therefore, the scope of protection of the present disclosure should be defined by the appended claims.

What is claimed is:

1. A universal serial bus (USB) hub with a host bridge function suitable for connecting a first host device, a second host device, and a plurality of peripheral devices, the USB hub comprising:
   a first upstream port configured to connect to the first host device;
   a second upstream port configured to connect to the second host device;
   a USB controller coupled to the first upstream port and the second upstream port, and configured to determine that whether power levels of the first upstream port and the second upstream port are greater than a predetermined level or not;
   a switch module connected to the USB controller, the first upstream port, and the second upstream port, and configured to switch the first upstream port and the second upstream port to respectively connect the USB controller and a host bridge controller;
   the host bridge controller connected to the USB controller and the switch module, configured to receive a first data from the first upstream port via the USB controller and the switch module and transmit the first data to the second host device connected to the second upstream port, and configured to receive a second data from the second upstream port via the USB controller and the switch module and transmit the second data to the first host device connected to the first upstream port; and
   a plurality of first downstream ports coupled to the USB controller, connected to the peripheral devices, and configured to transmit and receive the first data and the second data to/from the peripheral devices.

2. The USB hub with the host bridge function according to claim 1, wherein the host bridge controller comprises:
   a first bridge connected to the switch module and the USB controller, and configured to transmit and receive the first data and the second data transmitted via the switch module and the USB controller, and the first data and the second data parsed by the USB controller;
   a buffer connected to the first bridge, and configured to store the first data and the second data; and
   a second bridge connected to the buffer and the USB controller, and configured to transmit and receive the first data and the second data transmitted via the switch module and the USB controller, and the first data and the second data parsed by the USB controller.

3. The USB hub with the host bridge function according to claim 1, wherein the switch module is disposed in the host bridge controller, and the host bridge controller controls switching of the switch module.

4. The USB hub with the host bridge function according to claim 1, further comprising an upstream control circuit connected between the switch module and the USB controller, and configured to control data transmission and reception between the first host device and the USB controller.

5. The USB hub with the host bridge function according to claim 1, further comprising a plurality of first downstream control circuits connected between the first downstream ports and the USB controller, and configured to control data transmission and reception between the first downstream ports and the USB controller.

6. The USB hub with the host bridge function according to claim 1, further comprising a second downstream control circuit connected between the USB controller, the host bridge controller, and the switch module, and configured to control the data transmission and reception between the USB controller and the host bridge controller.

7. The USB hub with the host bridge function according to claim 1, wherein the power levels are level values of VBUS pins defined by USB interfaces of the first host device and the second host device.

8. The USB hub with the host bridge function according to claim 1, wherein in response to the first host device being connected to the USB hub earlier than the second host device, the switch module performs a switching operation so that the first host device is connected to the USB controller via the first upstream port, the switch module is switched simultaneously, and the second host device is connected to the host bridge controller via the second upstream port so that the first data from the first upstream port is transmitted from the first host device to the second host device.

9. The USB hub with the host bridge function according to claim 1, wherein in response to the second host device being connected to the USB hub earlier than the first host device, the switch module switches the second host device so that the second upstream port is connected to the USB controller, the switch module switches the first host device simultaneously, and the first upstream port is connected to the host bridge controller so that the second data from the second upstream port is transmitted from the second host device to the first host device.

10. A control method of a universal serial bus (USB) hub with a host bridge function suitable for connecting a first host device, a second host device, and a plurality of peripheral devices, the control method comprising steps of:
   determining that whether power levels of the first upstream port and the second upstream port are greater than a predetermined level or not by a USB controller;
   switching the first upstream port and the second upstream port to respectively connect the USB controller and a host bridge controller by a switch module according to the predetermined level;
   receiving, by the host bridge controller, a first data from the first upstream port via the USB controller and the switch module and transmitting the first data to the second host device connected to the second upstream port, and receiving a second data from the second upstream port via the USB controller and the switch module and transmitting the second data to the first host device connected to the first upstream port; and transmitting and receiving the first data and the second data to/from the peripheral devices by a plurality of first downstream ports.

11. The control method of the USB hub with the host bridge function according to claim 10, wherein the step of receiving, by the host bridge controller, the first data from the first upstream port via the USB controller and the switch module and transmitting the first data to the second host device connected to the second upstream port, and receiving the second data from the second upstream port via the USB controller and the switch module and transmitting the second data to the first host device connected to the first upstream port, comprising:

transmitting and receiving, by a first bridge, the first data and the second data transmitted via the switch module and the USB controller, and the first data and the second data parsed by the USB controller;

storing the first data and the second data by a buffer; and transmitting and receiving, by a second bridge, the first data and the second data transmitted via the switch module and the USB controller, and the first data and the second data parsed by the USB controller.

12. The control method of the USB hub with the host bridge function according to claim 10, wherein the step of receiving, by the host bridge controller, the first data from the first upstream port via the USB controller and the switch module and transmitting the first data to the second host device connected to the second upstream port, and receiving the second data from the second upstream port via the USB controller and the switch module and transmitting the second data to the first host device connected to the first upstream port, comprising:

controlling, by an upstream control circuit, data transmission and reception between the first host device and the USB controller.

13. The control method of the USB hub with the host bridge function according to claim 10, wherein the step of transmitting and receiving the first data and the second data to/from the peripheral devices by the plurality of first downstream ports, comprising:

controlling, by a plurality of first downstream control circuits, data transmission and reception between the first downstream ports and the USB controller.

14. The control method of the USB hub with the host bridge function according to claim 10, wherein the step of switching the first upstream port and the second upstream port to respectively connect the USB controller and the host bridge controller by the switch module according to the predetermined level, comprising:

controlling, by a second downstream control circuit, data transmission and reception between the USB controller and the host bridge controller.

15. The control method of the USB hub with the host bridge function according to claim 10, wherein the power levels are level values of VBUS pins defined by USB interfaces of the first host device and the second host device.

16. The control method of the USB hub with the host bridge function according to claim 10, wherein in response to the first host device being connected to the USB hub earlier than the second host device, the switch module performs a switching operation so that the first host device is connected to the USB controller via the first upstream port, the switch module is switched simultaneously, and the second host device is connected to the host bridge controller via the second upstream port so that the first data from the first upstream port is transmitted from the first host device to the second host device.

17. The control method of the USB hub with the host bridge function according to claim 10, wherein in response to the second host device being connected to the USB hub earlier than the first host device, the switch module switches the second host device so that the second upstream port is connected to the USB controller, the switch module switches the first host device simultaneously, and the first upstream port is connected to the host bridge controller so that the second data from the second upstream port is transmitted from the second host device to the first host device.

* * * * *